United States Patent [19]

Repose et al.

[11] 4,039,228
[45] Aug. 2, 1977

[54] TILTING PAD BEARING

[75] Inventors: John Repose, Trenton, N.J.; Ulysses Niatas, Yardley, Pa.

[73] Assignee: Delaval Turbine, Inc., Trenton, N.J.

[21] Appl. No.: 684,406

[22] Filed: May 7, 1976

[51] Int. Cl.² .................................... F16C 17/03
[52] U.S. Cl. ............................................ 308/73
[58] Field of Search ........................ 308/72, 73, 15

[56] References Cited

U.S. PATENT DOCUMENTS

| | | | |
|---|---|---|---|
| 3,022,123 | 2/1962 | Gruber | 308/73 |
| 3,542,441 | 11/1970 | Nixon | 308/73 |
| 3,708,216 | 1/1973 | Gerling | 308/73 |
| 3,807,814 | 4/1974 | Stopp | 308/73 |
| 3,887,245 | 6/1975 | Rouch | 308/73 X |

Primary Examiner—Robert R. Song
Assistant Examiner—Gene A. Church
Attorney, Agent, or Firm—John M. Calimafde; James M. Rhodes, Jr.

[57] ABSTRACT

A bearing is herein described having an annular housing defining a bore. A plurality of arcuate bearing shoes are spaced within the housing bore in such an array to define a cylindrical opening for axially receiving a rotatable shaft. The shoe members are disposed in a generally free floating posture.

Mechanical stops are provided for maintaining the shoes in a generally operational disposition while the shoes are still in a free floating condition. A spherical male and female combination of inserts are provided with their operational axis generally along a radius of the bore of the housing and located at the approximate center of the arc defined by each shoe. The male and female spherical members are then operable to provide universal movement about a point approximately at the center of the arc of each shoe so that each shoe is infinitely flexible to adapt to shaft variations.

6 Claims, 2 Drawing Figures

TILTING PAD BEARING

BACKGROUND OF THE INVENTION

This invention relates to rotary machinery bearings and, more specifically, relates to tilting shoe pad bearings.

In the design of high speed rotary machines, one of the most significant problems is the adjustment of shaft bearings in response to vibrations and uneven loading. With an inflexible journal bearing, even a small displacement of the bearing can cause severe uneven loading and consequential damage. Furthermore, heavy vibrations are transmitted through the bearing to the supporting structure.

Therefore, it is desirable to minimize the effects of vibration and uneven loading. If flexibility is provided so that some transverse motion of the journal bearing is permitted, the undesirable forces can be reduced. The rocking action of the shoes of the existing tilting pad journal bearings provides a degree of transverse motion and adjustment to help alleviate the problem.

Various types of tilting pad bearings have now been proposed including bearings having arcuate shoes held in place by radial pins which are loose fitting to permit rocking of the shoes. Another arrangement makes use of the pin point contact of a ball upon a flat surface in combination with mechanical stops such as the arrangement shown in U.S. Pat. No. 3,887,245 issued to Rouch in 1975.

Although the existing tilting pad bearings are effective in somewhat reducing the problems associated with rotary shaft misalignments and vibrations, none of these provide a simple arrangement wherein the bearing shoes may be free floating but yet are provided with universal adjustability and support, about one point, forces from all of the radial, circumferential and axial directions.

It would therefore be advantageous if a tilting pad bearing were provided which were uniquely uncomplicated but yet would provide universal adjustability.

OBJECTS AND SUMMARY OF THE INVENTION

It is therefore an object of the present invention to provide a tilting pad bearing for supporting a rotatable shaft wherein each of the pads is universally adjustable about a single point and, in operation, is always supported in each of the radial, axial and circumferential directions at that point.

This object and others are achieved by the provision of a bearing including an annular housing defining a cylindrical bore. A plurality of arcuate bearing shoes are spaced within the housing bore in such an array as to define a cylindrical opening for axially receiving a rotatable shaft. The shoes are disposed in a free floating posture and a mechanical stop arrangement is provided for maintaining the shoes in a generally operational disposition in the absence of a shaft to be supported.

A pivot arrangement is provided to support each shoe in the axial, radial and circumferential directions while maintaining each shoe in a floating posture. The pivot arrangement is formed between the inner surface of the annular housing and the radially outward surface of each arcuate shoe at the approximate mid-arc point thereof.

THE DRAWINGS

While the invention is particularly pointed out and distinctly claimed in a concluding portion of the specification, a preferred embodiment is set forth in the following detailed description which may be best understood when read in connection with the following drawings, in which:

FIG. 1 is an axial cross sectional view of a tilting pad bearing according to the present invention taken along a diameter thereof; and FIG. 2 is a sectional view of the tilting pad bearing of FIG. 1 taken along line 2—2.

DETAILED DESCRIPTION

Figure 1:
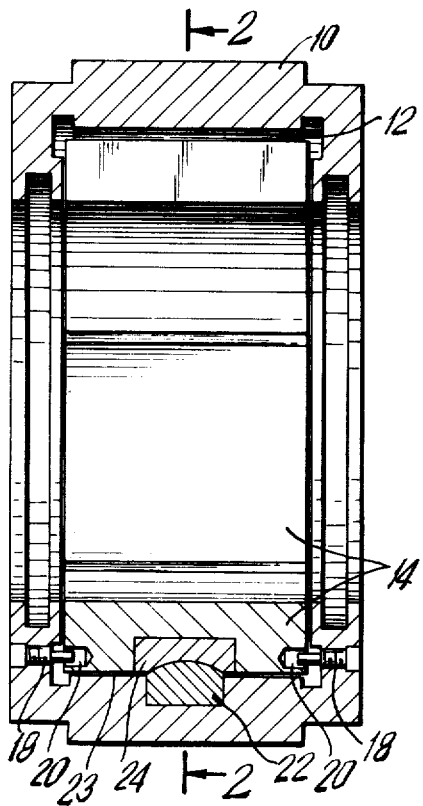
Figure 2:
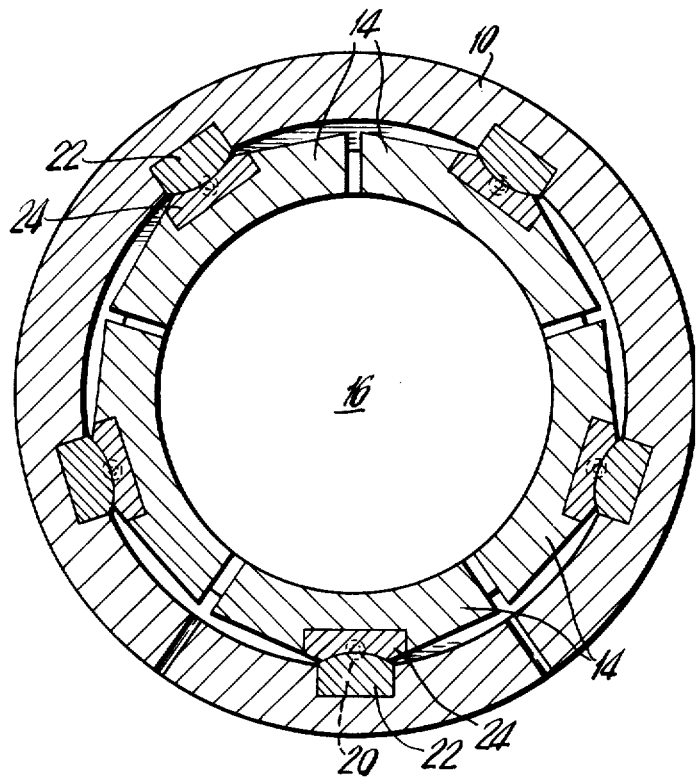

Referring now to the drawings in which like numerals are used to indicate like parts throughout the various views thereof, FIG. 1 shows the tilting pad bearing of the present invention to include an annular housing 10 defining a bore 12.

A plurality, preferably five, arcuate shoe members 14 are disposed within the bore 12 in such an array as to define a cylindrical opening 16 for axially receiving a rotatable shaft (not shown). The radially inward face of each shoe may be lined with a babbit material.

Each of the shoe members 14 is disposed in a free floating posture. A mechanical stop arrangement is provided which, in the preferred embodiment, may include pins 18 fixedly mounted within the upright portions of the U-shaped cross-sectional configuration of the annular portion of the housing member 10. The pins extend axially from the housing into oversized holes 20 formed in the radial faces of each of the arcuate shoe members 14. The pin 18 and hole 20 arrangement is sized so that the shoes 14 are free floating but yet restrained from engagement with each other and from moving radially inwardly a sufficient distance to define a cylindrical opening 16 having a diameter which is smaller than the diameter of the shaft to be supported.

In order to provide each shoe member 14 with a pivot having absolute universal adjustablility while maintaining the free floating characteristic thereof, a hardened steel, convex male insert 22 is embedded inside the horizontal (as shown in FIG. 1) portion of the U-shaped cross-section of the housing 10. A female insert 24 of hardened steel having an operative concave surface corresponding with the operative convex surface of the male insert 22 may be mounted within the radially outward face 23 of each shoe 14. Preferably, the female insert 24 is disposed at the approximate geometric center of the shoe face 23.

In operation, the pins 18 cooperate with the corresponding oversized openings 20 to maintain the five shoes 14 in a generally operational posture in the absence of a rotatable shaft to be supported. When a shaft is mounted within the bearing shoes 14, the shoes are universally adjustable about the inserts 22 and 24 to precisely engage the shaft and to adjust for any misalignment or unbalanced forces or vibrations. While each shoe is universally adjustable, the interacting concave and convex surfaces of the inserts 22 and 24 are operable to support forces from all the radial, circumferential and axial directions.

Although what has been described herein is a preferred embodiment of the present invention, it is, of course, to be understood that various modifications and changes may be made therein without departing from the invention. It is, therefore, intended to cover in the following claims all such modifications and changes as may fall within the true spirit and scope of the present invention.

What we claim is:

1. A bearing for a rotatable shaft comprising an annular housing defining a bore, a plurality of arcuate bearing shoes being spaced within the housing bore to define a cylindrical opening for axially receiving the shaft, said shoes being disposed in a free floating posture;

stop means being provided for maintaining said shoes in a generally operationally disposition in the absence of the shaft; and pivot means for generally supporting each said shoe in the axial, radial and circumferential directions while providing for the universal movement thereof about a fixed point when a rotatable shaft is operationally mounted within the bearing.

2. A bearing according to claim 1, wherein said stop means comprises pin means extending between said housing and each of said shoe members, said pin means being fixedly mounted in one of said housing and shoe member and extending into an opposing, oversized hole formed in the other of said housing and shoe member, said hole being sized to provide each said shoe with free movement but to prevent each said shoe from moving sufficiently radially inwardly to define a cylindrical opening having a smaller diameter than the diameter of the shaft to be supported.

3. Apparatus according to claim 1, wherein said pivot means comprises a partial ball and socket combination.

4. Apparatus according to claim 3, wherein said partial ball and socket arrangement comprises a spherically convex male insert aligned with a radius of said bore and a spherically concave female insert sized to operatively cooperate with said male insert.

5. Apparatus according to claim 4, wherein said male insert is embedded within the annular housing and said concave female insert is disposed within said shoe.

6. Apparatus according to claim 2, wherein the annular portion of said housing is generally U-shaped in axial cross-sectional configuration and said pins are fixedly mounted within the radially extending portions of the U-configuration to extend generally axially inwardly into the said oversized openings which are formed in the radial faces of said shoes.

* * * * *